(12) United States Patent
Gorza et al.

(10) Patent No.: US 10,435,057 B2
(45) Date of Patent: Oct. 8, 2019

(54) COLLAPSIBLE CHASSIS FOR STROLLERS, BABY CARRIAGES AND THE LIKE

(71) Applicant: L'INGLESINA BABY S.P.A., Altavilla Vicentina (IT)

(72) Inventors: Roberto Gorza, Pedavena (IT); Ivan Tomasi, Creazzo (IT)

(73) Assignee: L'INGLESINA BABY S.P.A., Altavilla Vicentina (IT)

( * ) Notice: Subject to any disclaimer, the term of this patent is extended or adjusted under 35 U.S.C. 154(b) by 0 days.

(21) Appl. No.: 15/745,318

(22) PCT Filed: Jul. 12, 2016

(86) PCT No.: PCT/EP2016/066553
§ 371 (c)(1),
(2) Date: Jan. 16, 2018

(87) PCT Pub. No.: WO2017/009345
PCT Pub. Date: Jan. 19, 2017

(65) Prior Publication Data
US 2019/0009810 A1 Jan. 10, 2019

(30) Foreign Application Priority Data
Jul. 15, 2015 (IT) .......................... 102015000034297

(51) Int. Cl.
*B62B 7/06* (2006.01)
*B62B 7/08* (2006.01)
(52) U.S. Cl.
CPC .............. *B62B 7/062* (2013.01); *B62B 7/086* (2013.01); *B62B 7/064* (2013.01);
(Continued)

(58) Field of Classification Search
CPC ......... B62B 7/062; B62B 7/086; B62B 7/064; B62B 2205/003; B62B 2205/02; B62B 2205/18
See application file for complete search history.

(56) References Cited

U.S. PATENT DOCUMENTS

| 6,991,248 B2 * | 1/2006 | Valdez | B62B 7/062 |
| | | | 280/647 |
| 7,237,795 B2 * | 7/2007 | Wu | B62B 3/12 |
| | | | 280/651 |

(Continued)

FOREIGN PATENT DOCUMENTS

| EP | 1982895 A2 | 10/2008 |
| EP | 2014536 A1 | 1/2009 |
| EP | 2243683 A1 | 10/2010 |

OTHER PUBLICATIONS

International Search Report dated Oct. 4, 2016 re: Application No. PCT/EP2016/066553; pp. 1-4.

(Continued)

*Primary Examiner* — Jacob B Meyer
(74) *Attorney, Agent, or Firm* — Cantor Colburn LLP

(57) ABSTRACT

A collapsible chassis for strollers includes a base frame supporting at least one front post and at least one rear post with wheel assemblies. The base frame further supports at least one handle tube. An actuation element is supported by the base frame and is actuated by the user to move the chassis from the open condition to the closed condition. The actuation element is movable with respect to both the handle tube and the movable post and is connected by way of a first kinematic connection element to the movable post and by way of a second kinematic connection element to the handle tube. Actuating the actuation element causes the rotation of the movable post and handle tube. A third kinematic connection element is provided which includes an articulation (Continued)

element adapted to cause a motion of mutual approach in a transverse direction of the two rear posts.

11 Claims, 12 Drawing Sheets

(52) U.S. Cl.
CPC ..... *B62B 2205/003* (2013.01); *B62B 2205/02* (2013.01); *B62B 2205/18* (2013.01)

(56) References Cited

U.S. PATENT DOCUMENTS

| | | | | |
|---|---|---|---|---|
| 7,296,820 B2* | 11/2007 | Valdez | ............ | B62B 7/062 280/647 |
| 7,364,182 B2* | 4/2008 | Jane Santamaria | ....... | B62B 7/10 280/47.38 |
| 7,401,803 B1* | 7/2008 | Lai | ............ | B62B 7/08 280/47.38 |
| 7,552,487 B2* | 6/2009 | Chen | ............ | A47D 13/063 248/292.12 |
| 7,571,926 B2* | 8/2009 | Huang | ............ | B62B 7/068 280/642 |
| 7,632,035 B2* | 12/2009 | Cheng | ............ | B62B 7/008 280/642 |
| 7,712,765 B2* | 5/2010 | Chen | ............ | B62B 9/20 280/642 |
| 8,308,391 B2* | 11/2012 | Cheng | ............ | B62B 7/008 280/642 |
| 8,408,580 B2* | 4/2013 | Liao | ............ | B62B 7/086 280/642 |
| 8,485,547 B2* | 7/2013 | Hsu | ............ | B62B 7/062 280/642 |
| 8,714,581 B2* | 5/2014 | Fritz | ............ | B62B 7/08 280/642 |
| 8,870,213 B1* | 10/2014 | Xu | ............ | B62B 7/08 280/642 |
| 8,894,089 B2* | 11/2014 | Clifton | ............ | B62B 5/0023 280/642 |
| 9,050,989 B2* | 6/2015 | Fleming | ............ | B62B 7/08 |
| 9,085,312 B2* | 7/2015 | Liu | ............ | B62B 7/08 |
| 9,199,658 B2* | 12/2015 | Chuah | ............ | B62B 7/08 |
| 9,216,755 B2* | 12/2015 | Eisinger | ............ | B62B 7/06 |
| 9,283,977 B2* | 3/2016 | Wu | ............ | B62B 7/006 |
| 9,421,991 B2* | 8/2016 | Driessen | ............ | B62B 7/08 |
| 9,475,516 B1* | 10/2016 | Wang | ............ | B62B 7/10 |
| 9,580,098 B2* | 2/2017 | Eisinger | ............ | B62B 7/06 |
| 9,902,417 B2* | 2/2018 | Storm | ............ | B62B 7/083 |
| 2003/0085551 A1* | 5/2003 | Allen | ............ | B62B 7/062 280/642 |
| 2004/0222616 A1* | 11/2004 | Valdez | ............ | B62B 7/062 280/647 |
| 2006/0061066 A1* | 3/2006 | Tan | ............ | B62B 7/062 280/642 |
| 2006/0125211 A1* | 6/2006 | Jane Santamaria | ..... | B62B 7/068 280/643 |
| 2006/0175803 A1* | 8/2006 | Santoski | ............ | B62B 7/062 280/642 |
| 2007/0096434 A1* | 5/2007 | Haeggberg | ............ | B62B 7/062 280/642 |
| 2008/0258436 A1* | 10/2008 | Storm | ............ | B62B 7/062 280/642 |
| 2009/0008907 A1* | 1/2009 | Huang | ............ | B62B 7/083 280/642 |
| 2011/0089670 A1 | 4/2011 | Henry | | |
| 2011/0215553 A1* | 9/2011 | Thorne | ............ | B62B 7/068 280/650 |
| 2012/0025495 A1* | 2/2012 | Minato | ............ | B62B 7/062 280/648 |
| 2012/0112435 A1* | 5/2012 | Kobayashi | ............ | B62B 7/062 280/647 |
| 2013/0147162 A1* | 6/2013 | Hsu | ............ | B62B 7/062 280/647 |
| 2013/0257019 A1* | 10/2013 | Eisinger | ............ | B62B 7/06 280/650 |

OTHER PUBLICATIONS

Written Opinion dated Oct. 4, 2016 re: Application No. PCT/EP2016/066553; pp. 1-6.

* cited by examiner

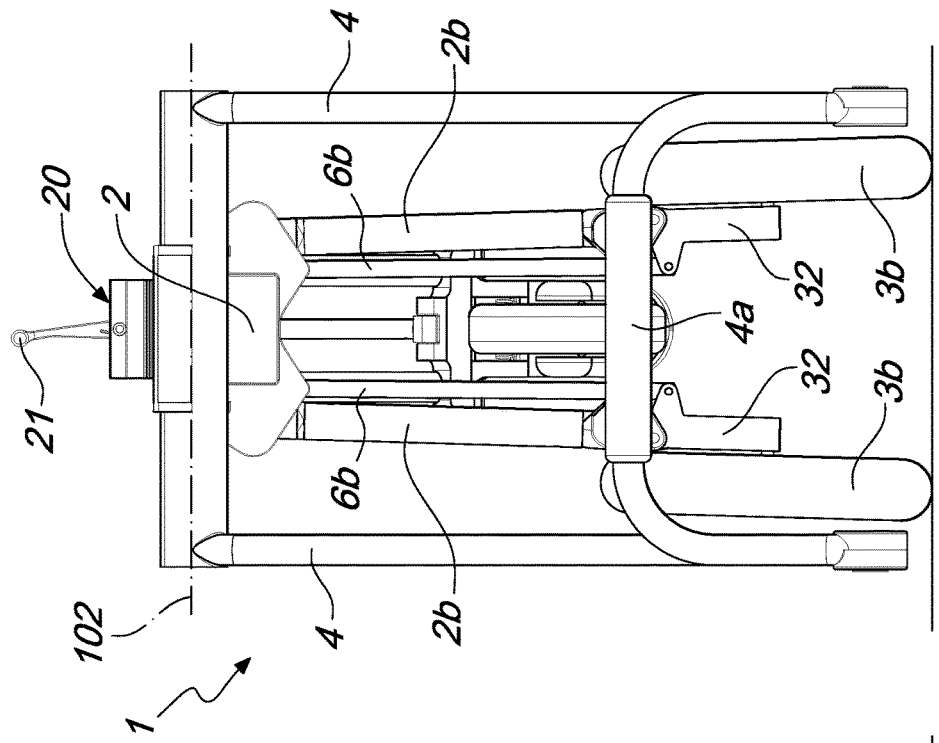
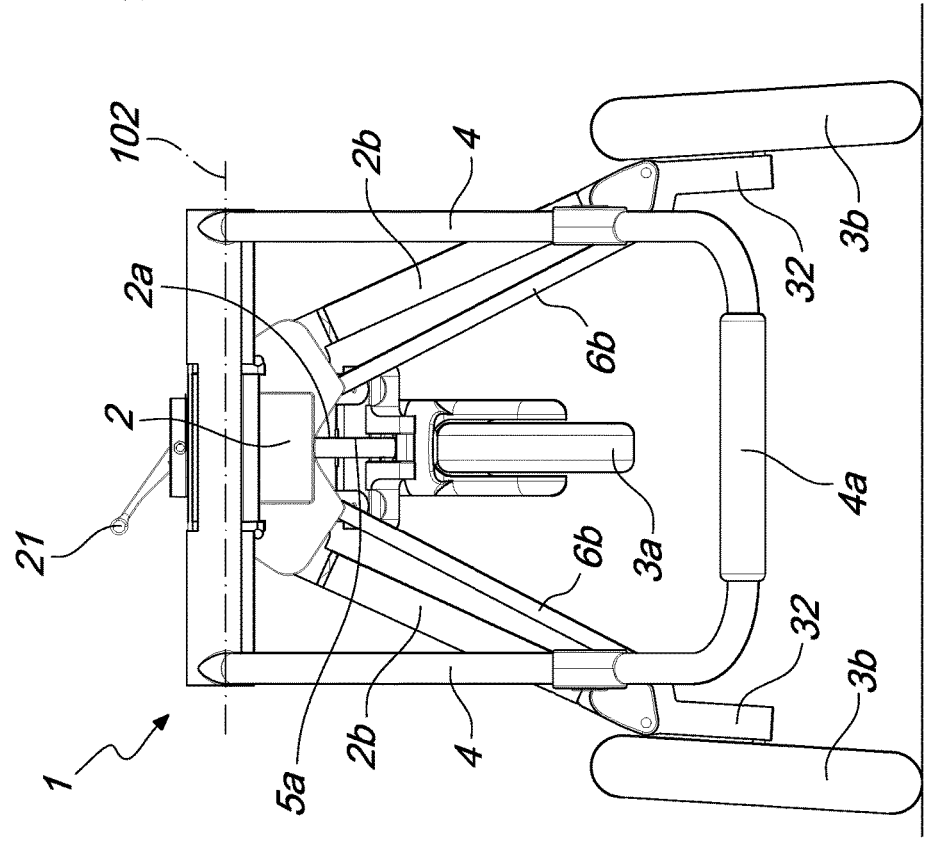

COLLAPSIBLE CHASSIS FOR STROLLERS, BABY CARRIAGES AND THE LIKE

TECHNICAL FIELD

The present disclosure relates to a collapsible chassis for strollers, baby carriages and the like.

BACKGROUND

Collapsible chassis for strollers or baby carriages are known which are substantially constituted by a lower frame, which comprises one or two front posts and one or two rear posts, which support in a downward region respective wheel assemblies, and by at least one upper post, known in the jargon as handle tube, which ends in an upward region with the handle or handgrip of the chassis and can move, with respect to the lower frame, with a rotary motion about a pivoting axis, in order to allow the execution of the closure or compaction of the chassis.

During the transition of the chassis from the extended condition to the collapsed condition, the front post also is rotated about an articulation axis that is parallel to the pivoting axis of the upper post in order to move angularly the upper post toward the rear post, so as to compact the chassis in a longitudinal direction.

This constructive solution allows, during the closure of the chassis, to move the front posts to an angularly closer position with respect to the respective rear posts, while the handle tube, by way of a rotary motion, is arranged, in the closed condition, substantially parallel to the rear posts.

Some of the known solutions provide, for this type of chassis, that the transition from the extended condition to the collapsed condition occurs by rotating the upper post (or handle tube) about the articulation axis and by connecting directly, by way of kinematic connection means, the upper post to the front post so that the rotation of the upper post about its own pivoting axis causes the rotation of the front post with respect to its own articulation axis.

Other solutions instead provide for control means, supported by the lower frame and connected kinematically to the front post in order to rotate it with respect to said lower frame.

In this specific case there are also kinematic connection means between the front post and the handle tube such as to determine, as a consequence of the rotation of the rear post, a consequent rotation of the handle tube.

In all the known solutions that provide for simultaneous movement, during the closing and opening steps, of the front post and of the handle tube there are kinematic connection means that directly connect the front post and the handle tube and are constituted typically by gears, interconnection linkages or equivalent means such as cables or traction elements.

Known solutions, though being widely used, suffer drawbacks.

First of all, in many cases the operations for closing and opening the chassis are scarcely practical and have criticalities in operation.

Furthermore, it is not always easy to manage rotation angles of a different breadth of the handle tube and of the front post.

Finally, sometimes it is difficult to actuate the closure of the chassis by means of lifting handles, it being necessary to provide devices that act by pushing or pulling directly on the posts.

SUMMARY

The aim of the present disclosure is indeed to solve the problems described above, by providing a chassis particularly for strollers, baby carriages and the like that has an extremely simplified structure with respect to currently known solutions, devising a chassis that is particularly practical and ergonomic.

The disclosure provides a collapsible chassis that is easy to use and offers the greatest assurances of reliability and safety in operation.

The present disclosure provides a collapsible chassis that can be obtained with low production costs.

These advantages and features that will become better apparent hereinafter, are achieved by providing a collapsible chassis comprising a base frame that supports at least one front post and at least one rear post, connected in a lower region to respective wheel assemblies, at least one between said at least one front post and said at least one rear post being movable with a rotary motion with respect to said base frame about an articulation axis that is substantially transverse to the direction of longitudinal extension of said chassis during the transition of said chassis from an extended open condition to a collapsed closed condition and vice versa, said base frame supporting further at least one handle tube, which defines grip means and can move with a rotary motion with respect to said lower frame about a pivoting axis that is substantially transverse to the direction of longitudinal extension of said chassis during the transition of said chassis from the extended open condition to the collapsed closed condition and vice versa, and further comprising an actuation element that is supported by said base frame and can be actuated by the user to move said chassis from said open condition to said closed condition, said actuation element being movable with respect to said handle tube and with respect to said at least one of said front and rear post that is movable being connected by way of first kinematic connection means to said at least one post that is movable with respect to said base frame about said articulation axis and, by way of second kinematic connection means, to said handle tube, the actuation of said actuation element causing the rotation, with respect to said base frame, of said at least one movable post about said articulation axis and of said handle tube about said pivoting axis, said chassis comprising two rear posts that can move, with respect to said base frame, about a respective folding axis that is substantially parallel to the central plane of said chassis and substantially perpendicular to the longitudinal direction of the respective rear post, third kinematic connection means being provided for connection between said actuation element and said two rear posts, said third kinematic connection means comprising articulation means adapted to cause, during the transition of said chassis from said extended open condition to said collapsed closed condition, a motion of mutual approach in a transverse direction of said two rear posts by means of a rotation about the respective folding axis.

BRIEF DESCRIPTION OF THE DRAWINGS

Further characteristics and advantages will become better apparent from the description of some preferred but not exclusive embodiments of the collapsible chassis according to the disclosure, illustrated by way of nonlimiting example with the aid of the accompanying drawings, wherein:

FIG. 9 is a rear view of the chassis in a condition that is intermediate between the extended condition and the collapsed condition;

FIG. 10 is a rear view of the chassis in the collapsed condition;

DETAILED DESCRIPTION OF THE DRAWINGS

Figure 1:
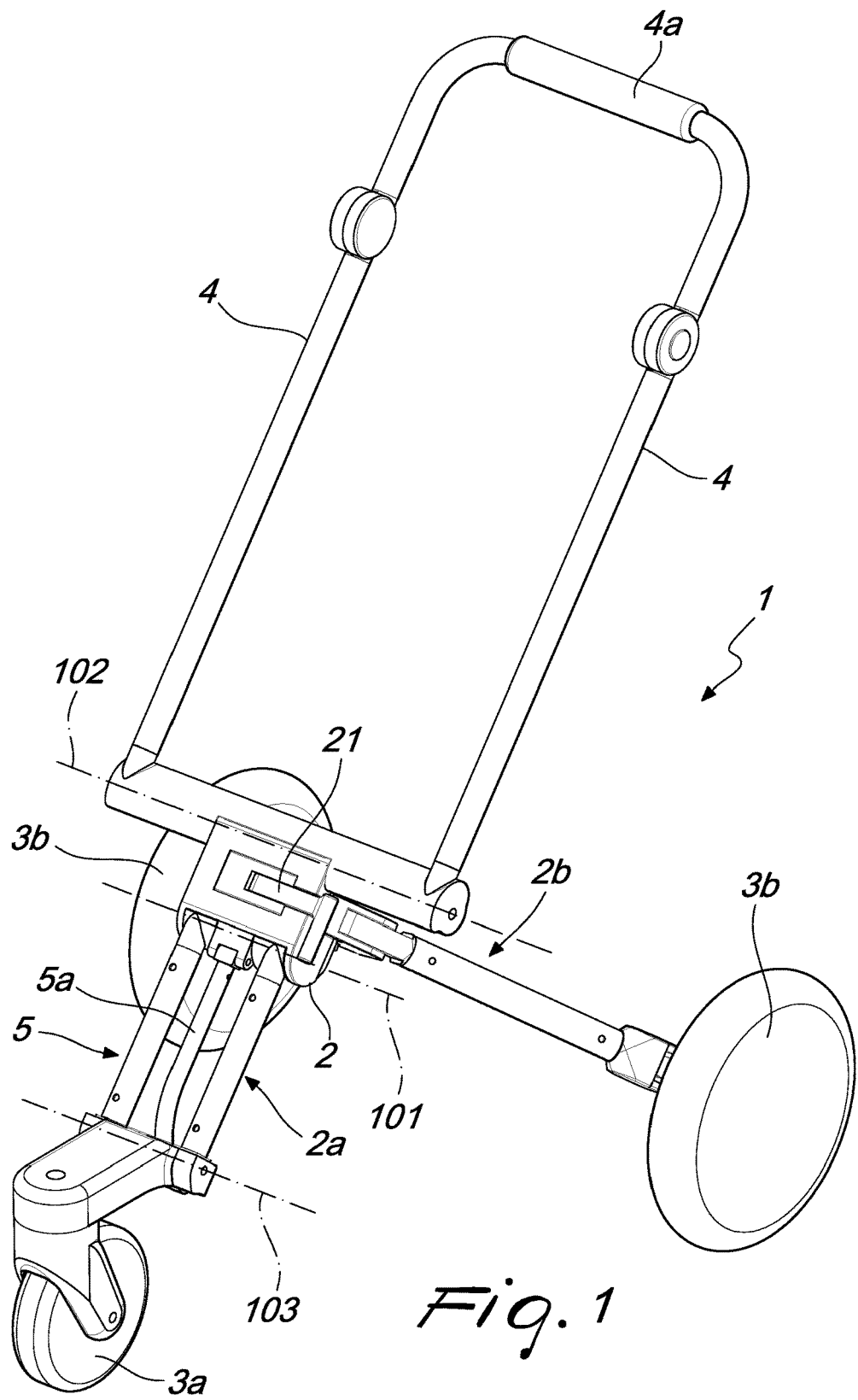
FIG. 1 is a perspective view of a chassis in the extended condition, according to the disclosure.
Figure 2:
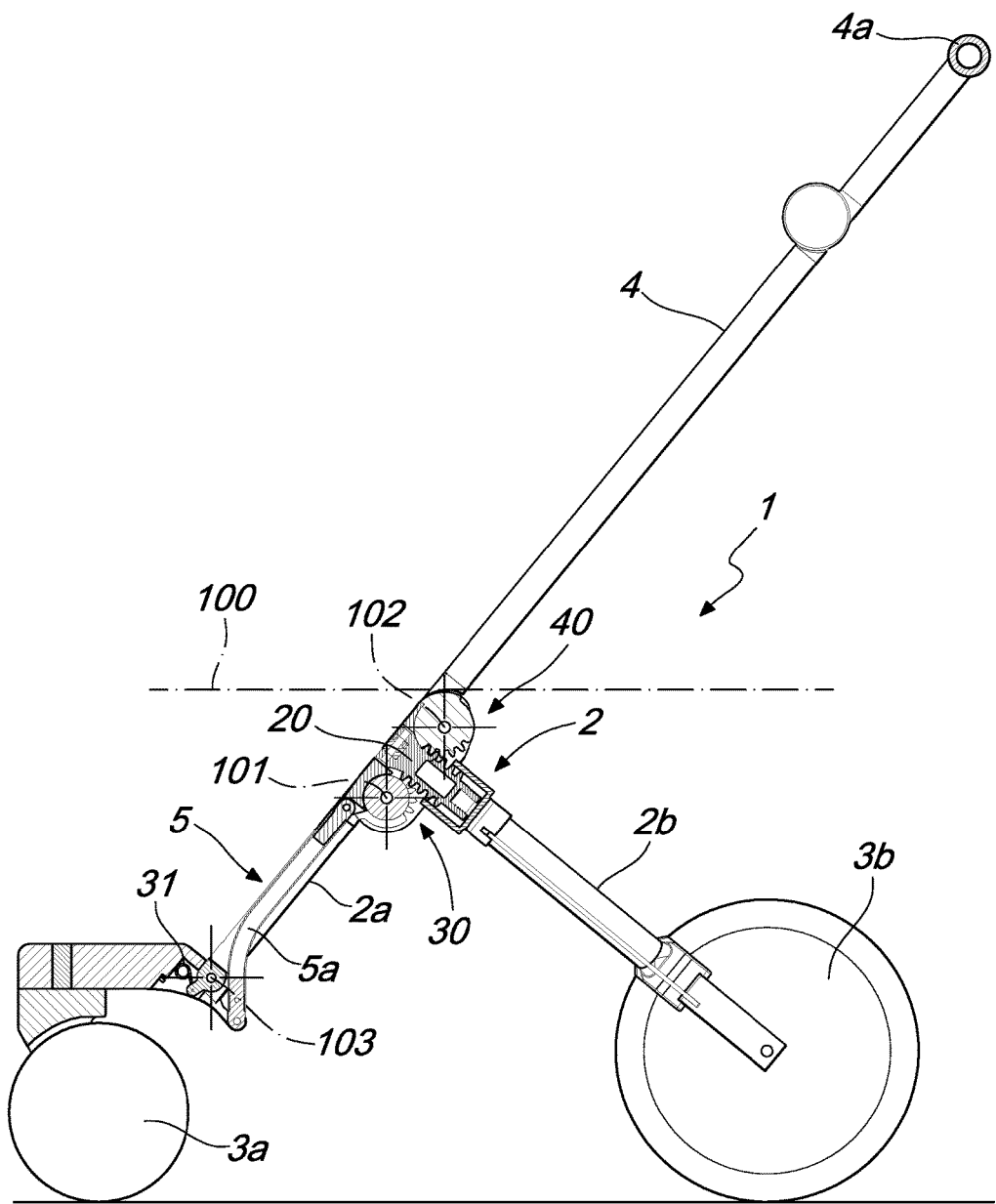
FIG. 2 is a sectional view of the chassis in the extended condition along a substantially longitudinal plane.
Figure 3:
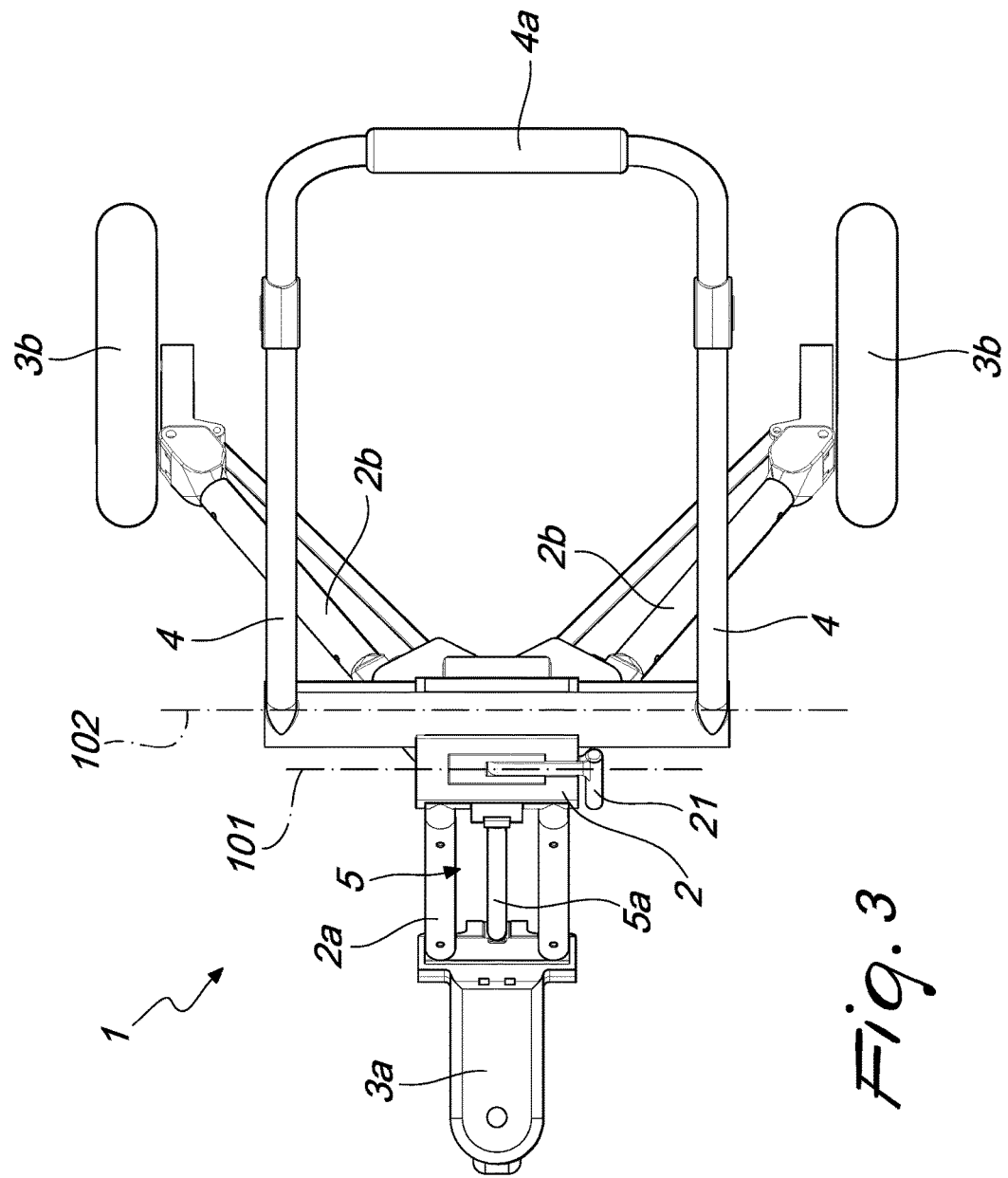
FIG. 3 is a top view of the chassis in the extended condition.
Figure 4:
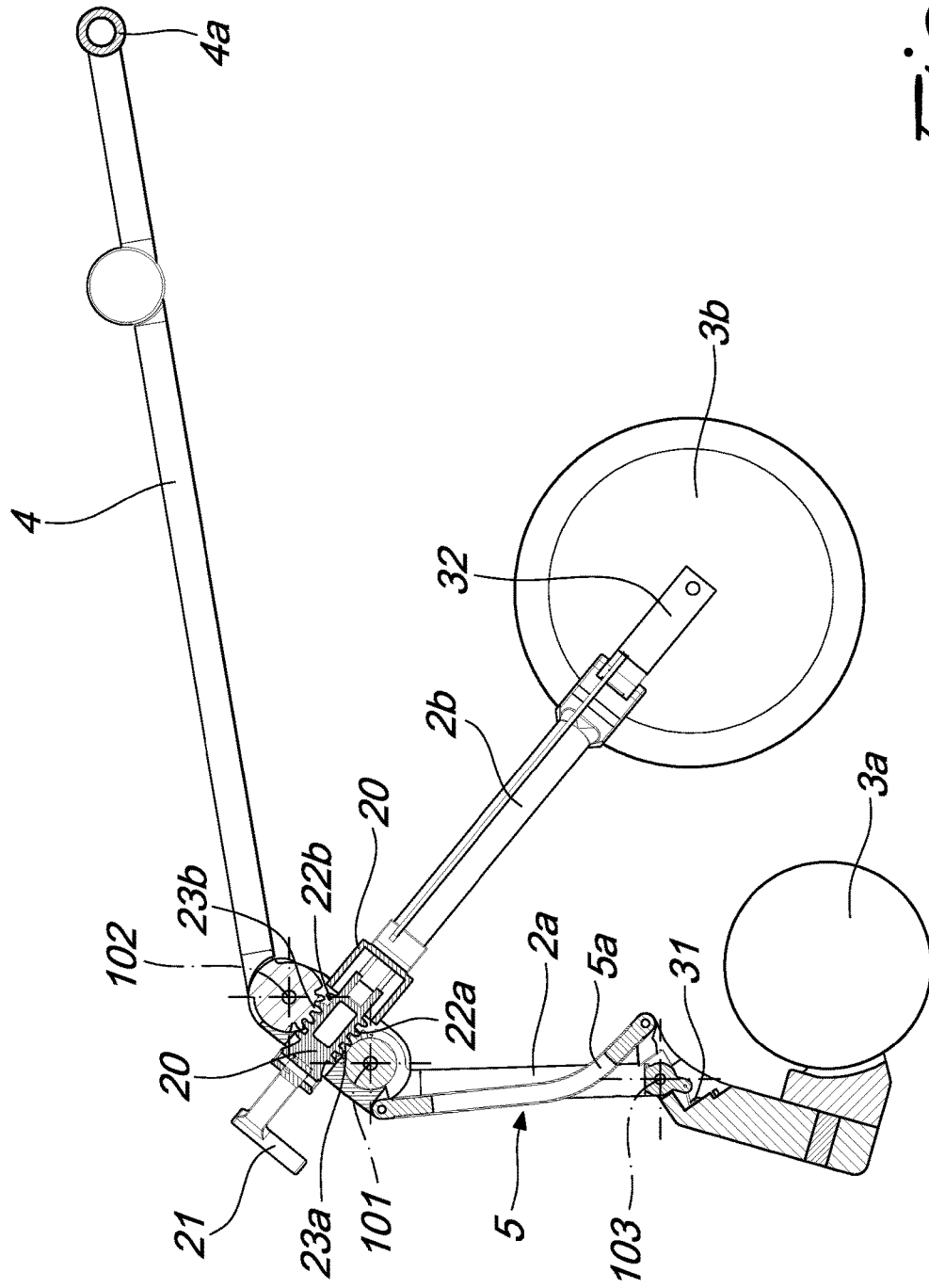
FIG. 4 is a sectional view, similar to FIG. 2, with the chassis in a condition that is intermediate between the extended condition and the collapsed condition.
Figure 5:
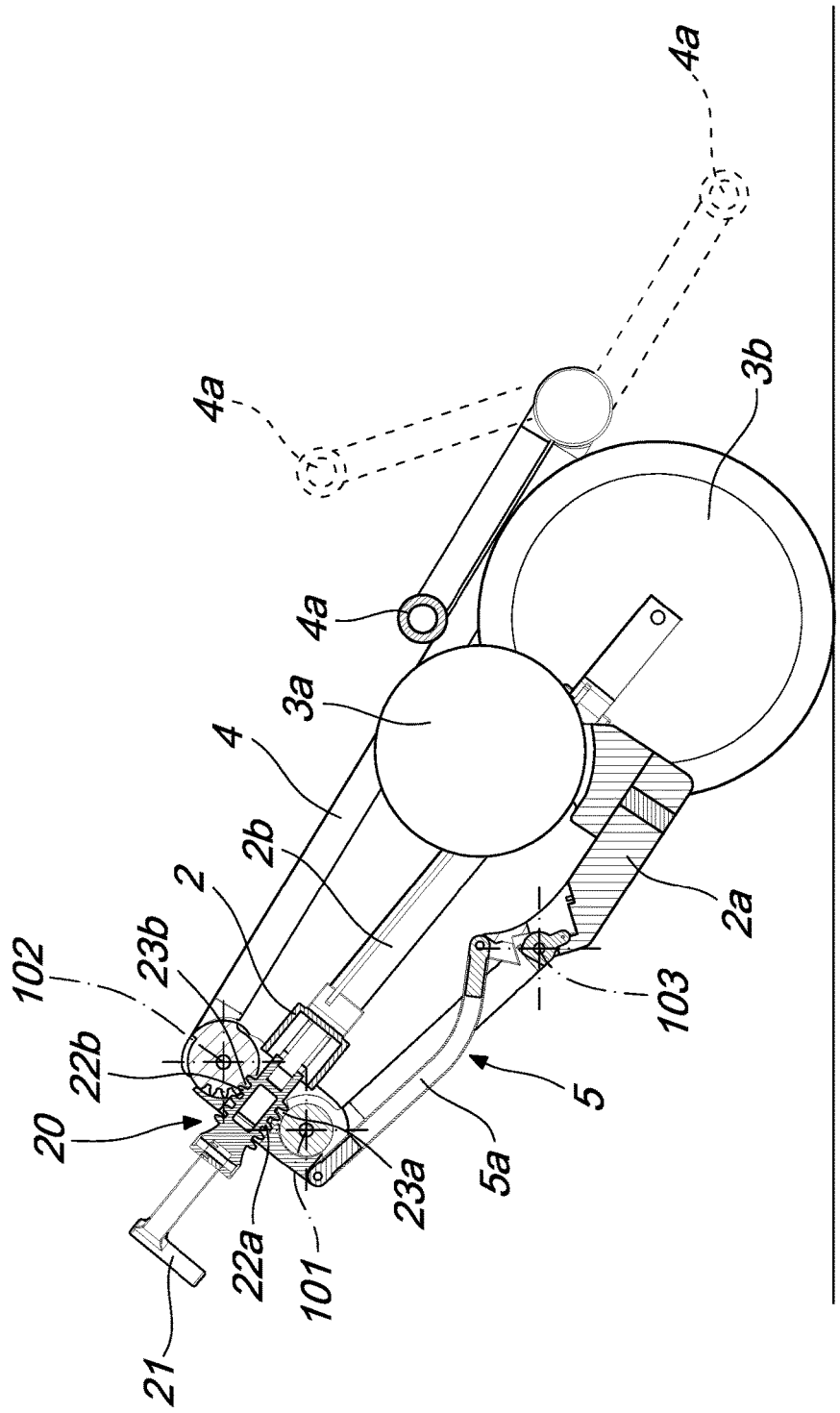
FIG. 5 is a sectional view, similar to that of FIGS. 2 and 4, with the chassis in the collapsed condition.
Figure 6:
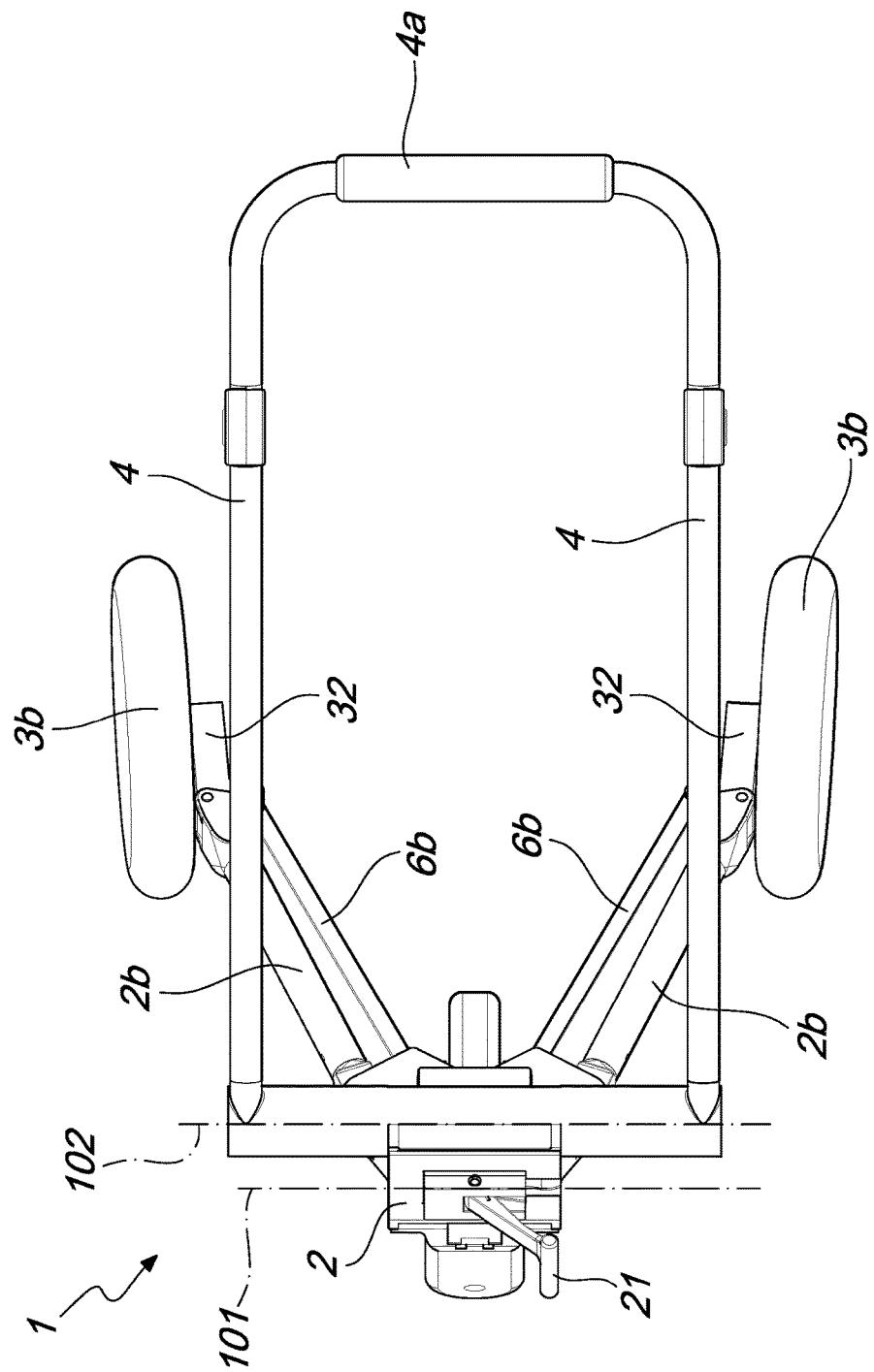
FIG. 6 is a top view of the chassis in a condition that is intermediate between the extended condition and the collapsed condition.
Figure 7:
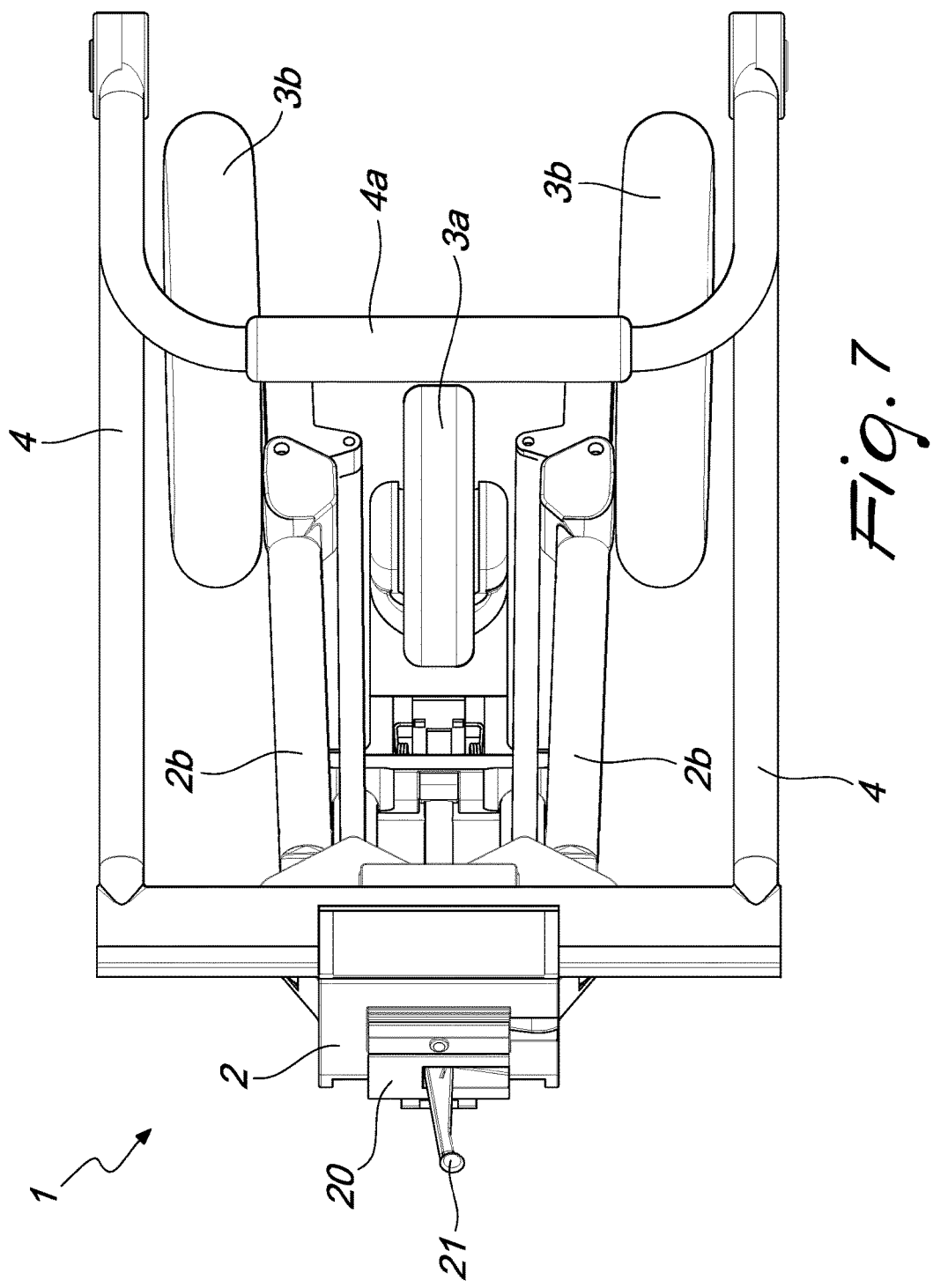
FIG. 7 is a top view of the chassis in the collapsed condition.
Figure 8:
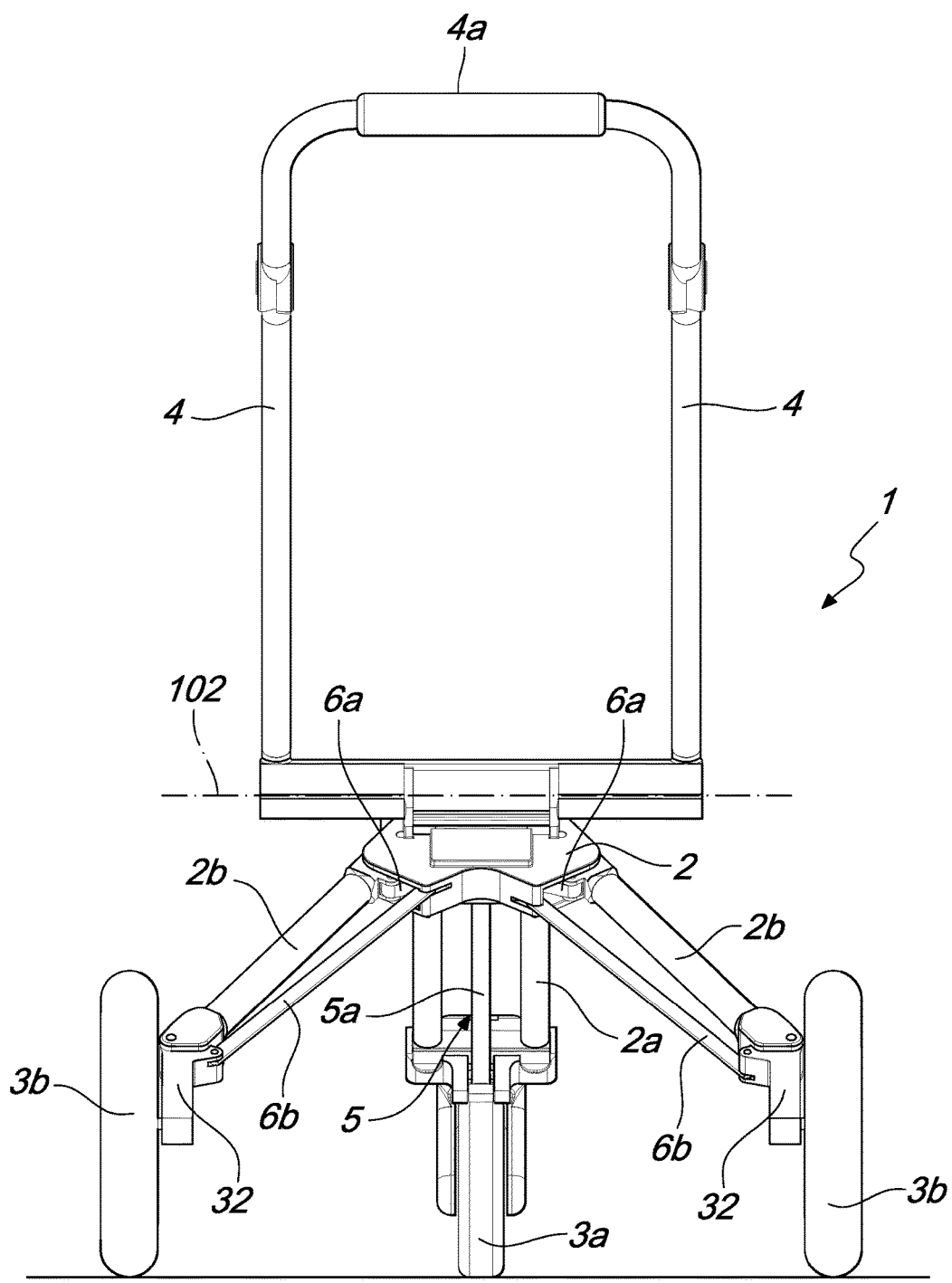
FIG. 8 is a rear view of the chassis in the extended condition.

In the exemplary embodiments that follow, individual characteristics, given in relation to specific examples, may actually be interchanged with other different characteristics that exist in other exemplary embodiments.

The present disclosure relates to a collapsible chassis, generally designated by the reference numeral 1, for strollers, baby carriages or the like.

The chassis 1 comprises a base frame 2, which supports at least one front post 2a and at least one rear post 2b, which are connected in a downward region to respective wheel assemblies 3a, 3b.

At least one between the at least one front post 2a and the at least one rear post 2b can move with a rotary motion with respect to the base frame 2 about an articulation axis 101 that is substantially transverse to the direction of longitudinal extension 100 of the chassis 1 during the transition of the chassis 1 from an extended open condition to a collapsed closed condition and vice versa.

The base frame 2 further supports at least one handle tube 4.

The handle tube 4 defines grip means 4a and can move with a rotary motion with respect to the lower frame 2 about a pivoting axis 102 during the transition of the chassis 1 from the open extended condition to the collapsed closed condition and vice versa.

The pivoting axis 102 also is substantially transverse to the direction of longitudinal extension 100 of the chassis 1.

The articulation axis 101 and the pivoting axis 102 can be arranged so as to be mutually spaced, as shown in the figures; however, nothing prevents these axes from coinciding.

Conveniently, the chassis 1 can be associated detachably with a containment receptacle 60 for a child.

Nothing prevents the chassis 1 from being detachably associable with a seat-like structure for people who have walking impairments or with a containment body for household pets.

According to the present disclosure, the chassis 1 comprises an actuation element 20 that is supported by the base frame 2 and can be actuated by the user to move the chassis 1 from the open condition to the closed condition.

The actuation element 20 can move with respect to the handle tube 4 and to the or each movable post.

The actuation element 20 is further connected, by way of first kinematic connection means 30, to the post or posts that can move with respect to the base frame 2 about the articulation axis 101 and, by way of second kinematic connection means 40, to the handle tube 4.

The chassis 1 is provided with two rear posts 2b which can move, with respect to the base frame 2, about a respective folding axis 104a, 104b that is substantially parallel to the central plane of the chassis 1 and substantially perpendicular to the direction of extension of the respective rear post 2a.

The two rear posts 2b can be movable, with respect to the base frame 2, about a same folding axis 104a.

In particular, the third kinematic connection means 50 comprise articulation means 6 which are adapted to determine, during the transition of the chassis 1 from the extended open condition to the collapsed closed condition, a motion of mutual approach in the transverse direction of the two rear posts 2b.

Figure 11:
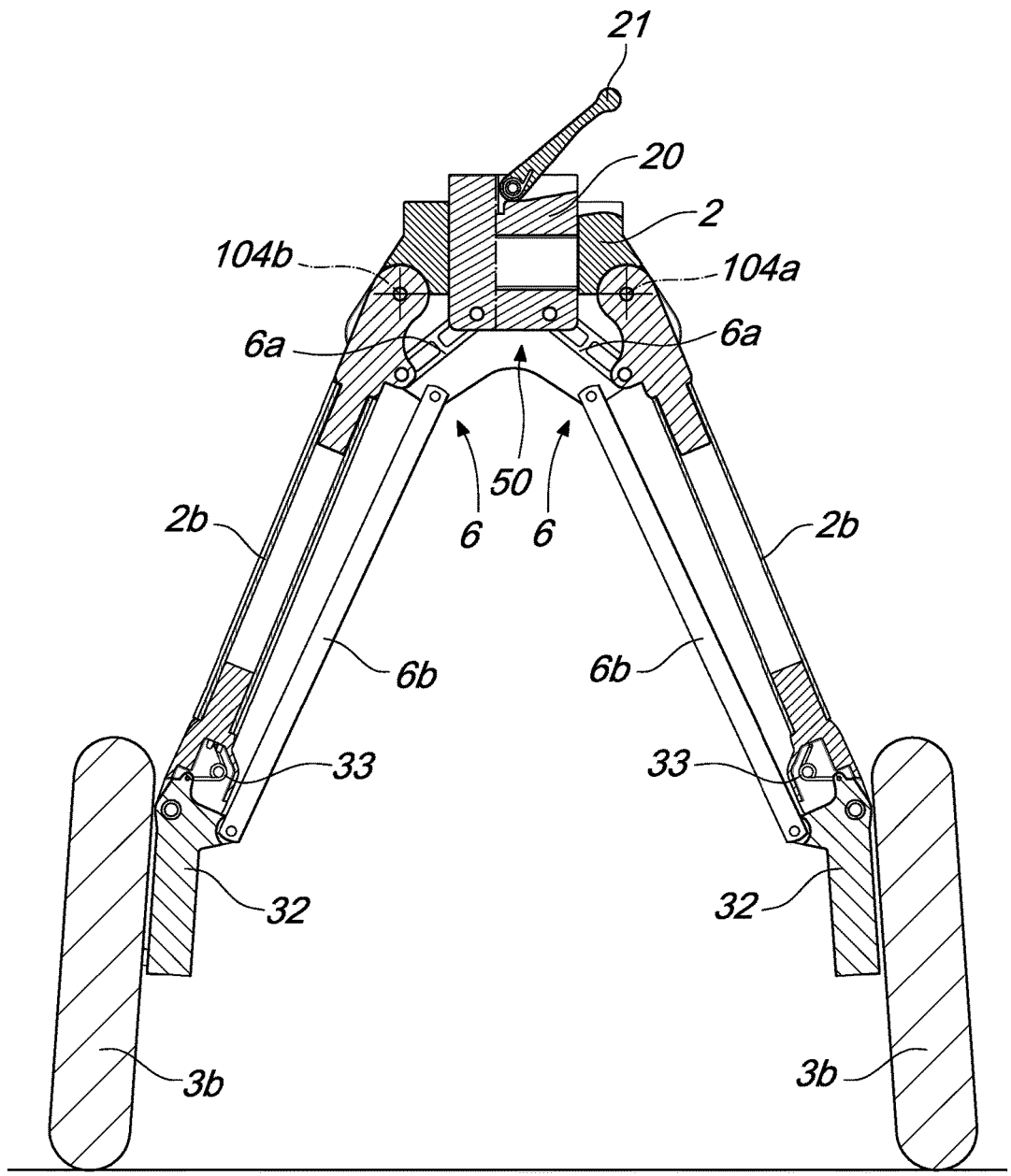
FIG. 11 is a sectional view, taken along a transverse plane, of a portion of the chassis.
Figure 12:
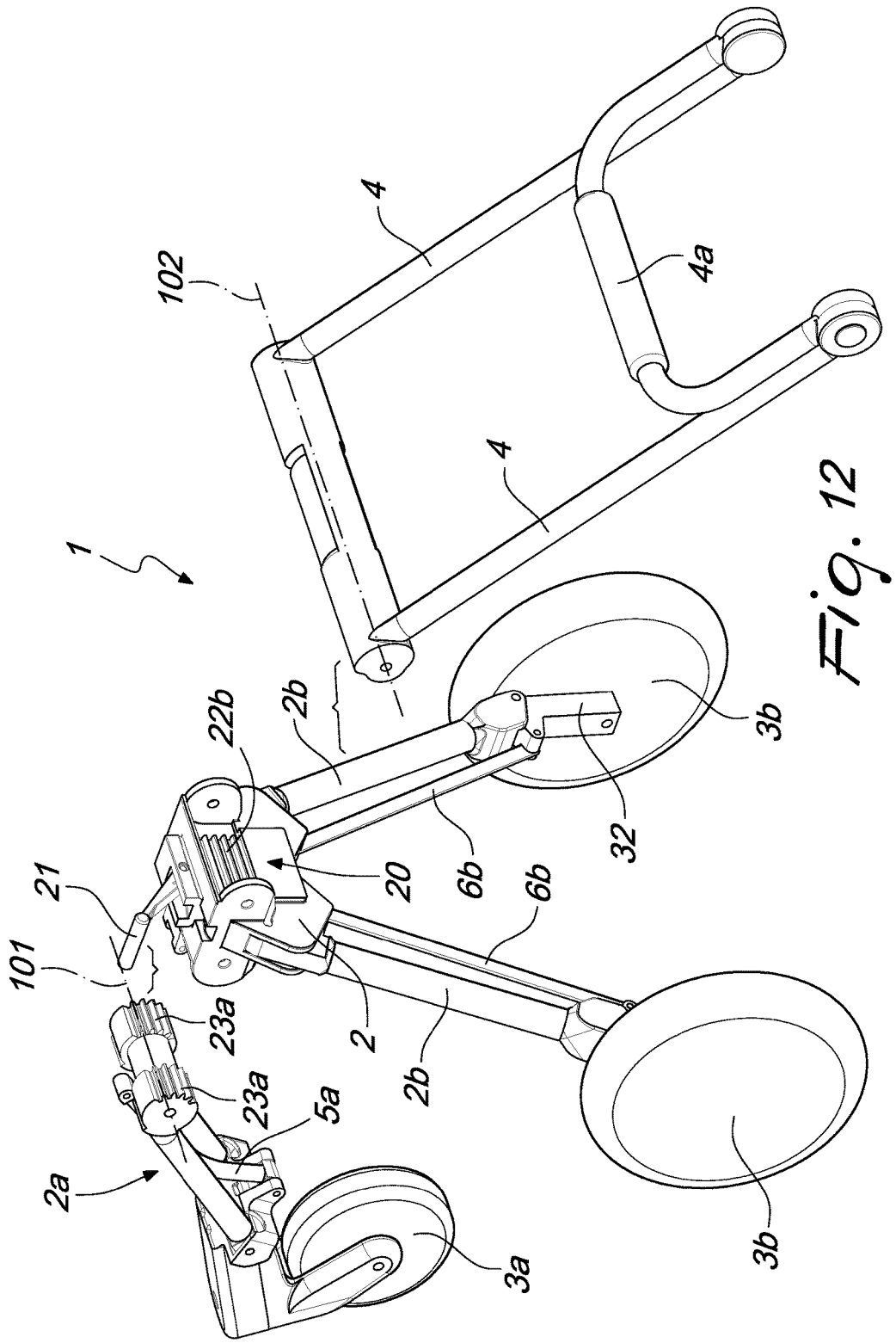
FIG. 12 is an exploded perspective view of the chassis.
Figure 13:
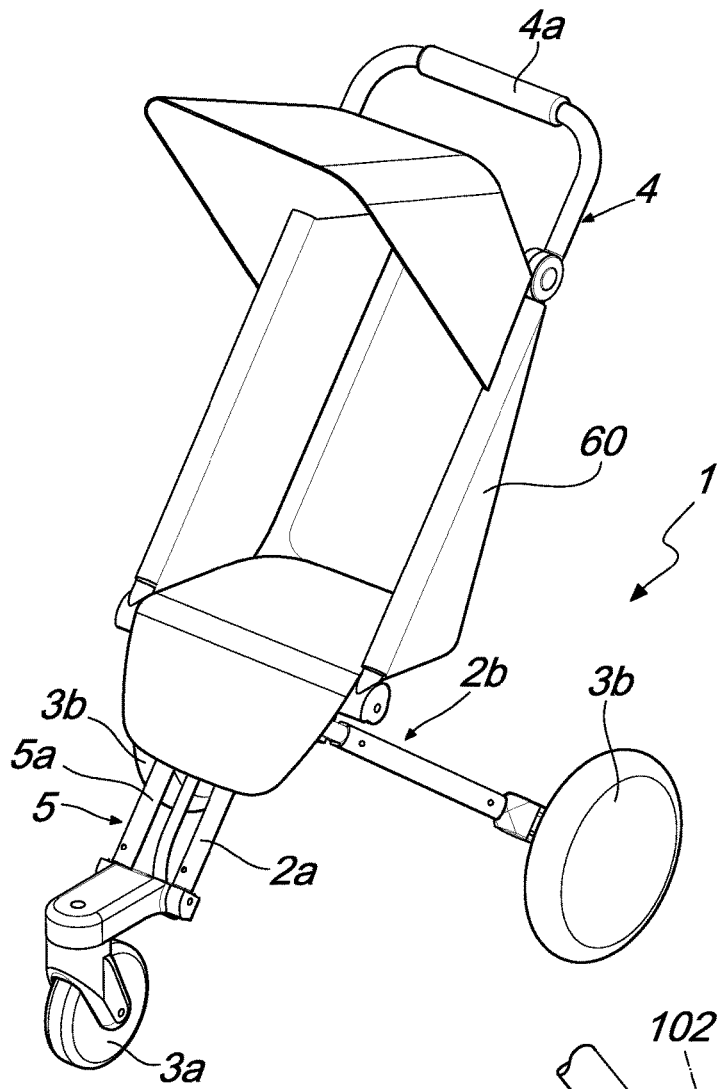
FIG. 13 is a view of a chassis associated with a device for accommodating a child.

With reference to the embodiment shown in FIG. 11, the articulation means 6 comprise, for each rear post 2b, an actuation linkage 6a, which connects the post 2b to the actuation element 20, and a guiding linkage 6b, which connects the rear post 2b to the base frame 2.

The actuation linkages 6a (which are moved by the actuation element 20) in practice cause the rotation of each rear post 2b about the respective folding axis 104a, 104b, while the guiding linkages, which connect the base frame 2 to a support 32 of the respective wheel assembly 3b, allows to orient correctly the rear post 2b and the wheel assembly 3b in space and guide its folding.

Conveniently, the rear post 2b also is connected rotatably to the support 32 of the respective wheel assembly 3b about a lateral retraction axis.

Between each support 32 of the rear wheel assembly 3b and the respective rear post 2b, proximate to the lateral retraction axis, it is possible to interpose an elastic thrust reversal device, such as for example a so-called trap spring 33, so as to facilitate the (outward) thrust of the rear wheel assembly 3b in the condition in which the chassis 1 is extended and at the same time facilitate the approach to the central plane of the chassis 1 of the rear wheel assemblies 3b in the condition in which the chassis 1 is collapsed.

Advantageously, the second kinematic connection means 40 are different from the first kinematic connection means 30.

In practice, the first kinematic connection means 30 directly connect the actuation element 20 to the front post 2b and the second kinematic connection means 40 directly connect the actuation element 20 to the handle tube 4.

In particular, the actuation of the actuation element 20 causes the rotation, with respect to the base frame 2, of the at least one movable post about the articulation axis 101 and of the handle tube 4 about the pivoting axis 102.

Simultaneously, the actuation element 20 actuates, by way of the third kinematic connection means 50, the folding of the rear posts 2b about the folding axis 104a, 104b.

Preferably, the movable post comprises at least one front post 2a.

Each front wheel assembly 3a can rotate with respect to the respective front post 2a about a retraction axis 103 that is transverse with respect to the direction of longitudinal extension 100 of the chassis 1.

Advantageously, there are retraction means 5 that act between the base frame 2 and the front wheel assembly 3a and are adapted to cause the rotation of the front wheel assembly 3a with respect to the respective front post 2a about the retraction axis 103 during the transition of the chassis 1 from the extended open condition to the collapsed closed condition and vice versa.

By way of example, the retraction means 5 comprise a retraction linkage 5a that has a first end rotatably connected to the base frame 2 and a second end rotatably connected to the front wheel assembly 3 in a position that is spaced from the retraction axis 103.

Between each front wheel assembly 3a and the respective front post 2a, proximate to the retraction axis 103, it is possible to interpose an elastic thrust reversal device, such as for example a so-called trap spring, so as to facilitate the retraction of the front wheel assembly 3a in the condition in which the chassis 1 is collapsed and at the same time facilitate its spacing in the longitudinal direction from the rear wheel assemblies 3b in the condition in which the chassis 1 is extended.

Furthermore, the end part of the handgrip can be retracted during the transition of the chassis 1 from the extended condition toward the collapsed condition, so as to reduce its vertical space occupation, so as to render the chassis more compact in the collapsed condition.

Obviously, in case of transition of the chassis from the collapsed condition to the extended condition, the end part of the handle returns to a position that is spaced from the pivoting axis 102.

According to a practical embodiment, the actuation element 20 can move, with respect to the base frame 2, along a movement path.

As shown in the figures, the movement path can be rectilinear; however, nothing prevents such movement path from being curvilinear or shaped like a circular arc.

Preferably, the chassis 1 comprises a control element 21 that is functionally associated with the actuation element 20.

By way of example, the control element 21 comprises a lifting handle.

In this case, the action of the user on the handle 21 causes a first rotation of the handle about a rotary connection region that is defined on the actuation element and then, as a consequence of a lifting action, the movement along the movement path of the actuation element 20 and consequently the movement, rotation, with respect to the base frame 2, of the movable post (in the specific case of the front post 2a) about the articulation axis 101 and of the handle tube 4 about the pivoting axis 102.

With reference to the embodiment shown in the figures, the actuation element 20 comprises a slider element that can move, with respect to the supporting frame 2, along a movement path and defines a first rack 22a and a second rack 22b.

In this case, the first kinematic connection means 30 comprise a first gear portion 23a that meshes with the first rack 22a, rotates integrally with the movable post and is extended around the articulation axis 101.

Likewise, the second kinematic connection means 4a comprise a second gear portion 23b that meshes with the second rack 22b, rotates integrally with the handle tube 4 and is extended around the pivoting axis 102.

As an alternative, the actuation element 20 can comprise a control element that can move, with respect to the base frame 2, along a movement path.

The first kinematic connection means 30 can comprise a first connecting linkage between the control element and the movable post, while the second kinematic connection means 40 can comprise a second connecting linkage between the control element and the handle tube.

In this manner it is possible, by choosing appropriately the length of the first and second connecting linkages and the pivoting points, to differentiate the angular movements of the movable post and of the handle tube respectively about the articulation axis and the pivoting axis.

Obviously, nothing forbids using a connecting linkage to provide the first kinematic connection means 30 and a rack-gear coupling to provide the second kinematic connection means 40 or vice versa.

Preferably, the control element 21 comprises a collapsible handle that is supported rotatably by the actuation element 20.

Retention devices act between the actuation element 20 and the base frame 2 and are adapted to block the movement of the actuation element 20 at the stroke limit position.

Preferably, the first kinematic connection means 30 and the second kinematic connection means 40 are constituted by rigid interconnection elements that are adapted to actuate the movement of the movable post and of the handle tube 4 both during transition from the extended condition toward the collapsed condition and vice versa.

Conveniently, the third kinematic connection means 50 also are adapted to actuate the movement of the movable post and of the handle tube 4 both during transition from the extended condition toward the collapsed condition and vice versa.

If one decides to use, in order to provide part of the first or second or third kinematic connection means with flexible elements, such as for example cables, it is appropriate to associate additional elements capable of ensuring, during the transition of the chassis 1 from the collapsed condition toward the extended condition, the rotation of the movable post, of the handle tube 4 and the mutual spacing in a transverse direction of the rear posts 2b.

Figure 14:
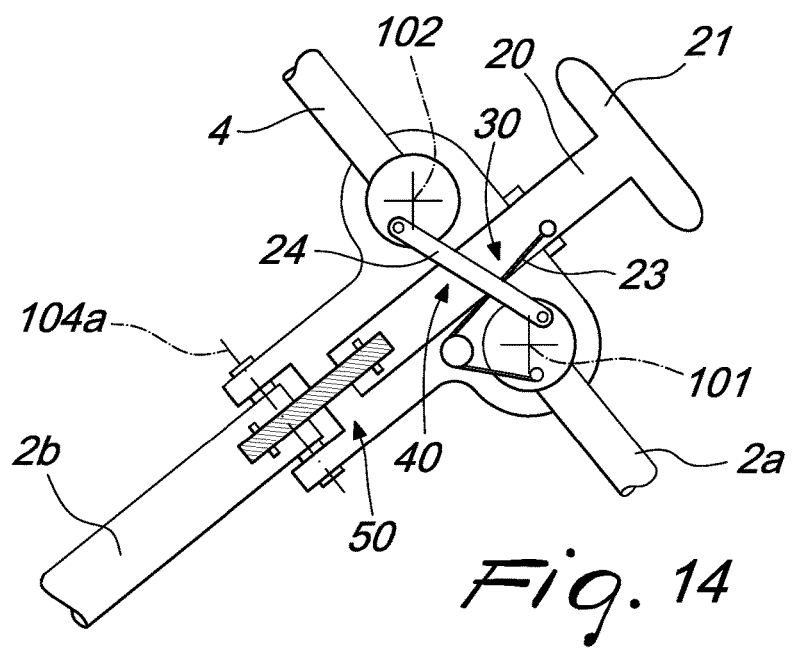
FIG. 14 is a view of a possible constructive variation of the control element associated with the chassis according to the disclosure.

With reference to the embodiment shown in FIG. 14, the actuation element 20 can actuate, for example by means of a cable 23 (which constitutes the first kinematic connection means 30), a strut or a tension element, the rotary motion of the front post 2a, which by way of second kinematic connection means 40, constituted for example by a linkage for the transfer of the rotation 24, actuates the rotary motion of the handle tube 4.

Obviously, the actuation element 20 is connected kinematically also to the rear posts 2b in order to cause, during the transition of the chassis 1 from the extended open condition to the collapsed closed condition, a mutual approach motion in a transverse direction of the two rear posts 2b.

As an alternative, the actuation element 20 can be connected by way of the second kinematic connection means 40 to the handle tube 4, which in turn is connected kinematically to the movable post.

Use of a collapsible chassis 1 according to the disclosure is evident from what has been described above.

In practice it has been found that the chassis according to the disclosure achieves the intended aim and objects thereof.

All the characteristics of the disclosure, indicated above as advantageous, convenient or the like, may also be omitted or replaced with equivalents.

The individual characteristics presented with reference to general teachings or particular embodiments may all be present in other embodiments or may replace characteristics in these embodiments.

The disclosure thus conceived is susceptible of numerous modifications and variations, all of which are within the scope of the appended claims.

All the details may further be replaced with other technically equivalent elements.

In practice, the materials used, so long as they are compatible with the specific use, as well as the contingent shapes and dimensions, may be any according to requirements.

The disclosures in Italian Patent Application No. 102015000034297 (UB2015A002212) from which this application claims priority are incorporated herein by reference.

The invention claimed is:

1. A collapsible chassis comprising a base frame that supports at least one front post and at least one rear post, connected in a lower region to respective wheel assemblies, at least one wheel assembly being disposed between said at least one front post and said at least one rear post being movable with a rotary motion with respect to said base frame about an articulation axis that is substantially transverse to the direction of longitudinal extension of said chassis during transition of said chassis from an extended open condition to a collapsed closed condition and during transition of said chassis from the collapsed closed condition to the extended open condition, said base frame supporting further at least one handle tube, which defines grip means and moves with a rotary motion with respect to said lower frame about a pivoting axis that is substantially transverse to the direction of longitudinal extension of said chassis during transition of said chassis from the extended open condition to the collapsed closed condition and transition of said chassis from the collapsed closed condition to the extended open condition, and further comprising an actuation element that is supported by said base frame and is actuated by the user to move said chassis from said open condition to said closed condition, said actuation element being movable with respect to said handle tube and with respect to said at least one of said front post and rear post that is movable being connected by way of first kinematic connection means to said at least one of said front post and said rear post that is movable with respect to said base frame about said articulation axis and, by way of second kinematic connection means, to said handle tube, the actuation of said actuation element causing the rotation, with respect to said base frame, of said at least one movable post about said articulation axis and of said handle tube about said pivoting axis, said chassis comprising said at least one rear post that moves, with respect to said base frame, about a respective folding axis that is substantially parallel to the central plane of said chassis and substantially perpendicular to the longitudinal direction of the respective rear post, third kinematic connection means being provided for connection between said actuation element and said at least one rear post, said third kinematic connection means comprising articulation means adapted to cause, during transition of said chassis from said extended open condition to said collapsed closed condition, a motion of mutual approach in a transverse direction of said at least one rear post by means of a rotation about the respective folding axis, wherein said actuation element comprises a slider element that moves, with respect to said supporting frame, along a movement path and defines a first rack and a second rack, said first kinematic connection means comprising a first gear portion that meshes with said first rack, is integral in rotation with said movable post and is extended around said articulation axis, said second kinematic connection means comprising a second gear portion that meshes with said second rack, rotates integrally with said handle tube and is extended around said pivoting axis.

2. The chassis according to claim 1, wherein said first kinematic connection means is a separate element from said second kinematic connection means.

3. The chassis according to claim 1, wherein said first kinematic connection means and said second kinematic connection means connect directly, respectively, said actuation element and said at least one front post and said actuation element and said at least one rear post.

4. The chassis according to claim 1, wherein said third kinematic connection means directly connect said actuation element to said rear posts.

5. The chassis according to claim 1, wherein said movable post comprises said at least one front post.

6. The chassis according to claim 1, wherein the wheel assembly associated with said at least one front post rotates, with respect to the respective front post, about a retraction axis that is transverse with respect to the direction of longitudinal extension of said chassis, retraction means being provided which act between said base frame and said front wheel assembly and are adapted to cause the rotation of said front wheel assembly with respect to the respective front post about said retraction axis during transition of said chassis from said extended open condition to said collapsed closed condition and during transition of said chassis from said collapsed closed condition to said extended open condition.

7. The chassis according to claim 1, wherein said actuation element moves, with respect to said base frame, along a movement path.

8. The chassis according to claim 1, further comprising a control element that is functionally associated with said actuation element.

9. The chassis according to claim 8, wherein said control element comprises a lifting handle, the lifting of said handle causing the movement of said actuation element and the rotation, with respect to said base frame, of said at least one movable post about said articulation axis, of said handle tube about said pivoting axis and of said rear posts about the respective folding axis.

10. The chassis according to claim 1, wherein said actuation element is connected kinematically, by way of said second kinematic connection means, to said at least one handle tube, which is connected, by way of said first kinematic connection means, to said movable post.

11. A collapsible chassis comprising a base frame that supports at least one front post and at least one rear post, connected in a lower region to respective wheel assemblies, at least one wheel assembly being disposed between said at least one front post and said at least one rear post being movable with a rotary motion with respect to said base frame about an articulation axis that is substantially transverse to the direction of longitudinal extension of said chassis during transition of said chassis from an extended open condition to a collapsed closed condition and during transition of said chassis from the collapsed closed condition to the extended open condition, said base frame supporting further at least one handle tube, which defines grip means and moves with a rotary motion with respect to said lower frame about a pivoting axis that is substantially transverse to the direction of longitudinal extension of said chassis during transition of said chassis from the extended open condition to the collapsed closed condition and transition of said chassis from the collapsed closed condition to the extended open condition, and further comprising an actuation element that is supported by said base frame and is actuated by the user to move said chassis from said open condition to said closed condition, said actuation element being movable with respect to said handle tube and with respect to said at least one of said front post and rear post that is movable being connected by way of first kinematic connection means to said at least one of said front post and said rear post that is movable with respect to said base frame about said articulation axis and, by way of second kinematic connection means, to said handle tube, the actuation of said actuation element causing the rotation, with respect to said base frame, of said at least one movable post about said articulation axis and of said handle tube about said pivoting axis, said chassis comprising said at least one rear post that moves, with respect to said base frame, about a respective folding axis that is substantially parallel to the central plane of said chassis and substantially perpendicular to the longitudinal direction of the respective rear post, third kinematic connection means being provided for connection between said actuation element and said at least one rear post, said third kinematic connection means comprising articulation means adapted to cause, during transition of said chassis from said extended open condition to said collapsed closed condition, a motion of mutual approach in a transverse direction of said at least one rear post by means of a rotation about the respective folding axis, wherein said actuation element comprises a control element which moves, with respect to said supporting frame, along a movement path, said first kinematic connection means comprising a first connecting linkage arranged between said control element and said movable post and said second kinematic connection means comprising a second connecting linkage arranged between said control element and said handle tube.

* * * * *